(12) United States Patent
Brand et al.

(10) Patent No.: US 7,831,867 B2
(45) Date of Patent: Nov. 9, 2010

(54) APPARATUS AND METHOD TO INTEGRATE HARDWARE ADAPTER TRACING WITH A HOST OS TRACING THROUGH SIGNALING

(75) Inventors: Aleksandra Brand, Wallkill, NY (US); Daniel P. Glaser, Tillson, NY (US); Jeffrey D. Haggar, Holly Springs, NC (US); Hugh E. Hockett, Raleigh, NC (US); Maurice Isrel, Raleigh, NC (US); Bruce Ratcliff, Red Hook, NY (US); Michael W. Stayton, Cary, NC (US); Jerry W. Stevens, Raleigh, NC (US); Stephen R. Valley, Valatie, NY (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 11/736,477

(22) Filed: Apr. 17, 2007

(65) Prior Publication Data

US 2008/0263408 A1 Oct. 23, 2008

(51) Int. Cl.
 *G06F 11/00* (2006.01)
(52) U.S. Cl. .................................. 714/45; 709/224
(58) Field of Classification Search ....................... None
 See application file for complete search history.

(56) References Cited

U.S. PATENT DOCUMENTS

| 6,084,859 | A | | 7/2000 | Ratcliff et al. |
| 6,145,123 | A | * | 11/2000 | Torrey et al. ................. 717/128 |
| 6,161,201 | A | | 12/2000 | Payne et al. |
| 6,185,218 | B1 | | 2/2001 | Ratcliff et al. |
| 6,202,199 | B1 | * | 3/2001 | Wygodny et al. ............ 717/125 |
| 6,327,621 | B1 | | 12/2001 | Lee et al. |
| 6,389,027 | B1 | | 5/2002 | Lee et al. |
| 6,445,682 | B1 | * | 9/2002 | Weitz .......................... 370/257 |
| 6,490,285 | B2 | | 12/2002 | Lee et al. |

(Continued)

FOREIGN PATENT DOCUMENTS

EP 1589692 10/2005

(Continued)

OTHER PUBLICATIONS

International Search Report; International Application No. PCT/EP2008/053802; International Filing Date: Feb. 31, 2008; Date of mailing: Jan. 8, 2008; 12 pages.

*Primary Examiner*—Gabriel L Chu
(74) *Attorney, Agent, or Firm*—Cantor Colburn LLP; John Campbell (57) ABSTRACT

The present invention provides a system and method for controlling tracing functions on a remote device. The system includes means for receiving a diagnostic signal from a host device on the remote device and means for associating the diagnostic signal with a tracing state of the remote device. In addition, the system includes means for performing a tracing function indicated by the diagnostic signal. The present invention can also be viewed as a method for controlling tracing functions on a remote device. The method operates by receiving a diagnostic signal from a host device on the remote device and associating the diagnostic signal with a tracing state of the remote device. Then, the method performs a tracing function indicated by the diagnostic signal.

18 Claims, 5 Drawing Sheets

U.S. PATENT DOCUMENTS

| | | |
|---|---|---|
| 6,529,427 B1 | 3/2003 | Guo |
| 6,577,597 B1 | 6/2003 | Natarajan et al. |
| 6,584,491 B1 * | 6/2003 | Niemi et al. ............... 709/202 |
| 6,584,502 B1 | 6/2003 | Natarajan et al. |
| 6,600,743 B1 | 7/2003 | Lee et al. |
| 6,668,277 B1 | 12/2003 | Gritzo |
| 6,772,221 B1 | 8/2004 | Ratcliff et al. |
| 6,836,881 B2 * | 12/2004 | Beynon et al. ............. 717/128 |
| 6,988,008 B2 | 1/2006 | Hudson et al. |
| 7,020,598 B1 | 3/2006 | Jacobson |
| 7,139,681 B2 | 11/2006 | Yoshie et al. |
| 7,162,533 B2 | 1/2007 | Klemets |
| 7,308,492 B2 | 12/2007 | Konopka et al. |
| 2002/0049801 A1 | 4/2002 | Beynon et al. |
| 2002/0198983 A1 * | 12/2002 | Ullmann et al. ............ 709/224 |
| 2003/0061550 A1 * | 3/2003 | Ng et al. ...................... 714/45 |
| 2005/0091373 A1 * | 4/2005 | Ciapala et al. ............. 709/224 |
| 2006/0045089 A1 | 3/2006 | Bacher et al. |

FOREIGN PATENT DOCUMENTS

| | | |
|---|---|---|
| EP | 1705833 | 9/2006 |

* cited by examiner

APPARATUS AND METHOD TO INTEGRATE HARDWARE ADAPTER TRACING WITH A HOST OS TRACING THROUGH SIGNALING

CROSS REFERENCE TO RELATED APPLICATIONS

The present application is co-pending with application Ser. No. 11/736,432, filed Apr. 17, 2007, and assigned to the assignee of the present application.

BACKGROUND OF THE INVENTION

The IBM Open Systems Adapter (OSA) is a hardware element that interlaces between an IBM S/390 or zSeries processor and a network, which may be a private network within an enterprise, a public network, or a combination of both. References that describe the Open Systems Adapter include the following patents, patent applications and publications, incorporated herein by reference: U.S. Pat. No. 6,772,221, Ratcliffet al., "Dynamically configuring and monitoring hosts connected in a computing network having a gateway device"; U.S. Pat. No. 6,600,743, Lee et al., "IP multicast interface"; U.S. Pat. No. 6,490,285, Lee et al., "IP multicast interface" [0008] U.S. Pat. No. 6,389,027, Lee et al., "IP multicast interface"; U.S. Pat. No. 6,327,621. Lee et al., "Method for shared multicast interface in a multi-partition environment"; U.S. Pat. No. 6,185,218, Ratcliffet al., "Communication method and apparatus for use in a computing network environment having high performance LAN connections"; and U.S. Pat. No. 6,084,859, Ratcliffet at, "internet Protocol assists using multi-path channel protocol".

In many communications error scenarios associated with server and network communications, it is not always clear if the source of the problem is a software (e.g. Operating Systems) or hardware (e.g. network adapter) error. Often the external symptoms of the problem may not reveal the root source of the problem. When this occurs, both software and hardware documentation (traces and dumps) must be collected. This process is often referred to as "Problem Determination", Problem determination is the process of isolating the source of the problem to a specific product (most often hardware vs. software).

Although each product (software and hardware) has tools that provide data collection, what is missing is the ability to trace both hardware and software level packet information at the same time for the same instance of an error. This deficiency causes many problems recreating attempts and in some field situations can lead to customer satisfaction issues.

Some Operating Systems have a set of tools that allows a trace to be set to capture network traffic or network events as seen by the host OS. However, the processing that occurs to the network traffic at the remote hardware adapter level is not seen by the host OS. At the hardware adapter level packets can be altered (such as fragmented, translated, or even dropped). Today network adapter traces must be manually controlled (started and stopped) by remote hardware tools. Often the tools are third party vendor tools which cannot see inside the adapter.

What is needed is the ability to capture all hardware trace activity and integrate the software and hardware trace collection process together with a single set of tools.

SUMMARY OF THE INVENTION

Embodiments of the present invention provide a system and method for controlling tracing functions on a remote device. Briefly described, in architecture, one embodiment of the system, among others, can be implemented as follows. The system includes means for receiving a diagnostic signal from a host device on the remote device and means for associating the diagnostic signal with a tracing state of the remote device. In addition, the system includes means for performing a tracing function indicated by the diagnostic signal.

Embodiments of the present invention can also be viewed as providing methods for controlling tracing functions on a remote device. In this regard, one embodiment of such a method, among others, can be broadly summarized by the following steps. The method operates by receiving a diagnostic signal from a host device on the remote device and associating the diagnostic signal with a tracing state of the remote device. Then, the method performs a tracing function indicated by the diagnostic signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides the ability to integrate the software and hardware trace collection process together. Each OS has the ability to activate the Network Trace Analyzer and optionally specify which types of traffic they would like to monitor or trace using "filters". A filter provides the ability to reduce or limit what type of data is traced. Examples of type of and how many filters OSA will support are described herein. The processing cycles spent in OSA vs. those in the host to filter or discard non-interesting data is the rationale for supporting trace filters.

This is accomplished with a host OS signal to network adapter to instruct adapter to also capture traces when a software trap event occurs. This capability will allow the software and hardware traces to be captured, correlated, and coordinated at the same time based on the same error event. This capability will allow users to use and leverage their existing tools within their operating environment to control, display, capture, and process the trace records. Having this ability allows users to monitor, debug, and diagnose networking problems without having to depend on OEM equipment and tools (i.e. OEM sniffer tools or utilities). Having a single and familiar set of tools is very beneficial. A single host image running trace is capable of capturing network traffic (packets) for any logical processor sharing the same network adapter (OSA).

The present invention describes a new function that allows the host OS to control OSA diagnostic functions (i.e. trace). A control signal (assist primitive) will, provide this support. The assist primitive will have the following attributes: (1) the assist function is based on existing QDIO architecture (similar to IP Assist); (2) the function is applicable to both Layer 2 and Layer 3 modes of QDIO; (3) the new primitive is extendable to new trace actions and functions and will support the TRAP function with actions: enable, modify, replace and disable.

A control signal is used to provide this support. This signal will allow the host operating system operator to control various OSA diagnostic functions (initially trap). The new primitive will be applicable to all supported QDIO modes (layer 2, layer 3, and OSN). Therefore, a new QDIO assist primitive is created for this design. The new primitive will be here after referred to as "Set Diagnostic Assist" (SetDiagAsst).

Figure 1:
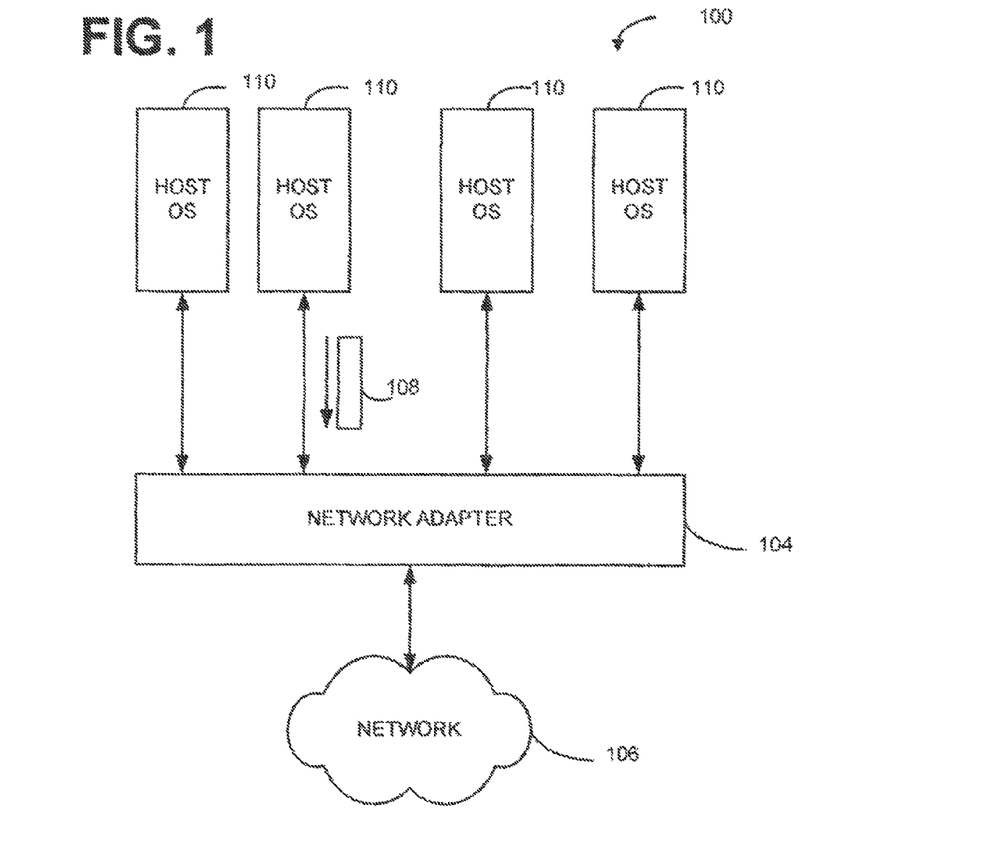
FIG. 1 is a block diagram of a virtual network configuration utilizing integrated trace diagnostics through signaling methods of the present invention.

FIG. 1 is a block diagram of a virtual network configuration utilizing integrated diagnostics through signaling methods of the present invention. FIG. 1 shows a configuration incorporating the present invention. The configuration contains a physical machine 100 coupled via a network adapter 104 to a network 106. A physical machine 100 is a data processing system (i.e., processing circuits) suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention is not limited to any particular hardware or software platform, in an exemplary embodiment the physical machine 100 may constitute an IBM™ eSeries™ zSeries™ server (IBM, eServer and zSeries are trademarks of IBM Corporation). Network adapter 104 (also referred to herein as a "OSA" or simply a "remote device") forwards data packets 108 between the network 106 and physical machine 100 and may comprise an IBM Open Systems Adapter, described in the patents and publications referenced above. Network 106 may be an internal network such as a local area network (LAN) within an organization, an external network, or a combination of both and may have other physical machines or devices (not shown) coupled to it. In a conventional manner, physical machine 100 is partitioned into a plurality of logical machines, each of which has its own host operating system (OS) 110 (also referred to herein as a "server" or simply a "host"), for example, an instance of the IBM z/OS™ or z/VM™ operating system or a UNIX™ based operating system such as the Linux™ operating system, (z/OS and st/VM are trademarks of IBM Corporation; UNIX is a registered trademark of The Open Group in the United States and other countries; Linux is a trademark of Linus Torvalds in. the United States, other countries, or both).

Figure 2:
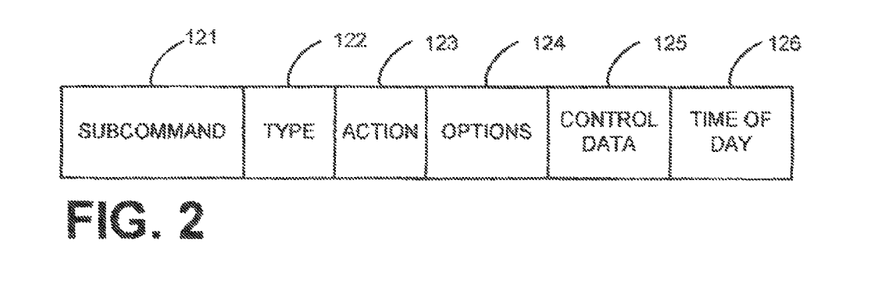
FIG. 2 is a block diagram of a signaling data packet utilized by the virtual network configuration as shown in FIG. 1.

FIG. 2 is a block diagram of a signaling control signal data packet utilized by the virtual network configuration as shown in FIG. 1. Each data packet 108 traveling between network adapter 104 and either machine 102 or network 106 contains a number of fields of interest to the present invention, may include, but are not limited to Subcommand 121 (trace, trap or dump), Type 122 (the type of Trace, Trap, or Dump that will be affected). Action 123 (the action that is to be taken (e.g. for Trap=Enable, Modify, Replace and Disable); Options 124 (specific options applicable to the specific subcommand and action); Control Data 125 (optional control "data" or information based on type of subcommand and action); and TOD 126 (a double word host generated data representing the time of day that the host sent the command to OSA), In the illustrated example, the present invention utilizes a Trace subcommand that has the following four functions (actions) with each action having the following rules.

Action=Enable is to enable (activate/start) the OSA trace immediately and begin sending the trace records to a data device. This command can include the applicable filter information. Action=Modify is to modify the currently used trace filters and includes applicable filter information. Action=Replace is to replace all the current trace filter is based upon the contents of the replace command. Action=Disable is to disable (deactivate/stop) the OSA trace.

Figure 3:
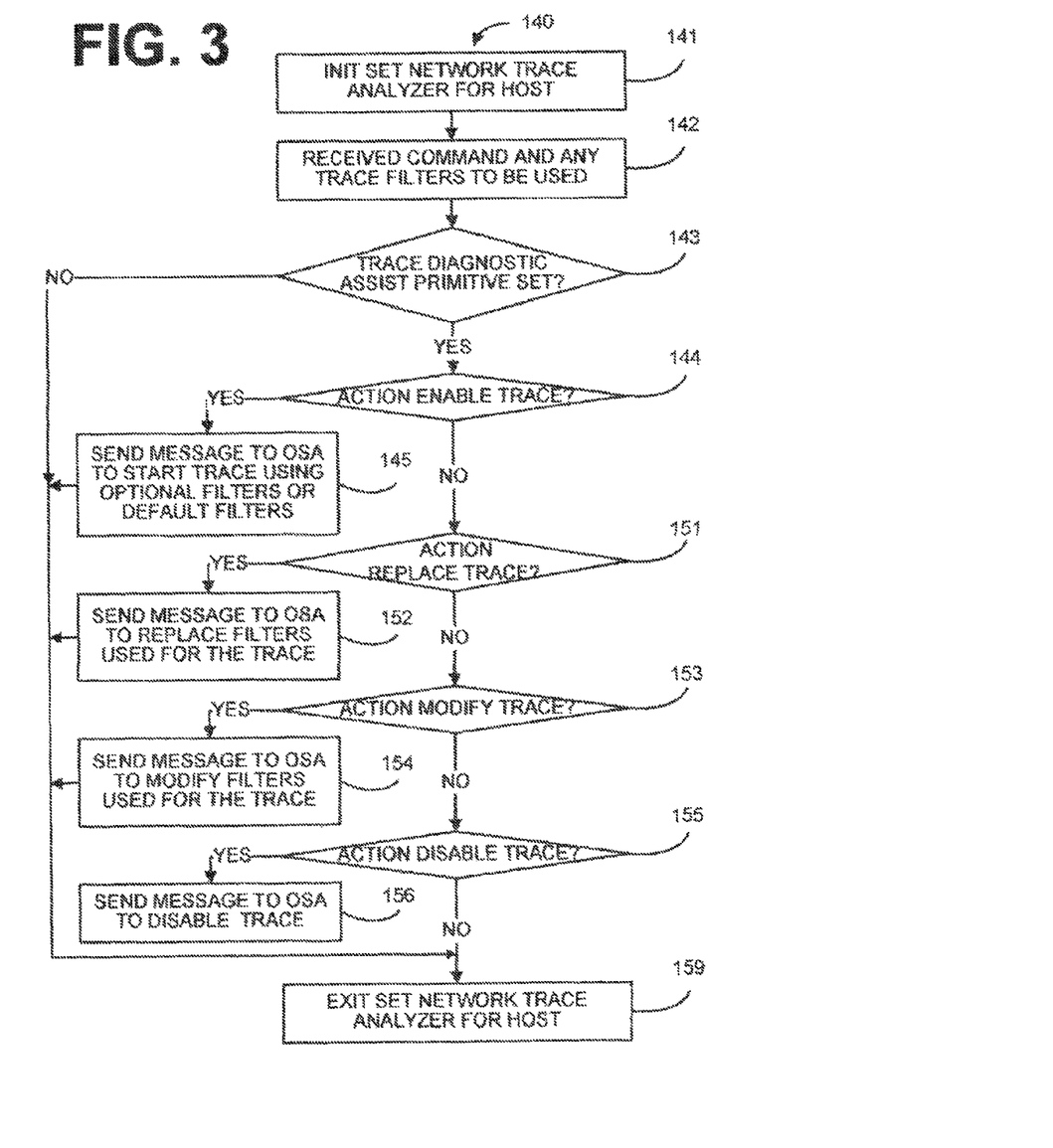
FIG. 3 is an example of a flow chart of the network trace analyzer control process of the present invention.

FIG. 3 is an example of a flow chart of the set network trace analyzer control process 140 of the present invention. The set network trace analyzer control process 140 is initialized at step 141. The initialization includes the establishment of data values for particular data structures utilized in the set network trace analyzer control process 140. At step 142, the host 110 receives a command. In the exemplary embodiment, this command is generated by the operator of host 110. In an alternative embodiment, this trace command can be automatically generated by software.

At step 143, the host 110 determines if the trace diagnostic assist primitive is set if it is determined at step 143 the trace diagnostic assist primitive is not set, then the set network trace analyzer control process 140 exits at step 159. However, if it is determined at step 143 the diagnostic assist primitive is set, then it is determined if the action to be taken it is an enable trace function. If it is determined to step 144 that the action to be taken is enable trace, then the host 110 sends a message to the OSA 104 instructing the OSA 104 to capture traces immediately, at step 145. When OSA 104 receives a SetDiagAsst with Action=Enable trace, it will update the Diagnostic Assist State.

However, if it is determined at step 144 that the action to be taken is not an enable trace function, then it is determined at step 151 if the action to be taken is a Replace Trace function. If it is determined at step 151 that the action is a Replace Trace function, then the host 110 sends a message, at step 152, to the OSA 104 to replace all currently used trace filters with those included in the command received at step 142.

However, if it is determined at step 151 that the action to be taken is not a Replace Trace, then it is determined at step 153 if the action to he taken is a Modified Trace function. If it is determined at step 153 that the action to be taken is a modify trace function, then the host 110 sends a message to the OSA 104 to modify the lifters, used in the trace function as indicated in the command received from the host 110 at step 142 traces at step 154.

However, if it is determined at step 153 that the action to be taken is not a modify trace function, then it is determined at step 155 if the action to be taken is a Disable Trace function.

If it is determined at step 155 that the action to be taken is a Disable Trace function, then the host 110 sends a message to the OSA 104 to disable capture of traces at step 156.

The host 110 then exits the set network trace analyzer control process 140 at step 159.

Figure 4:
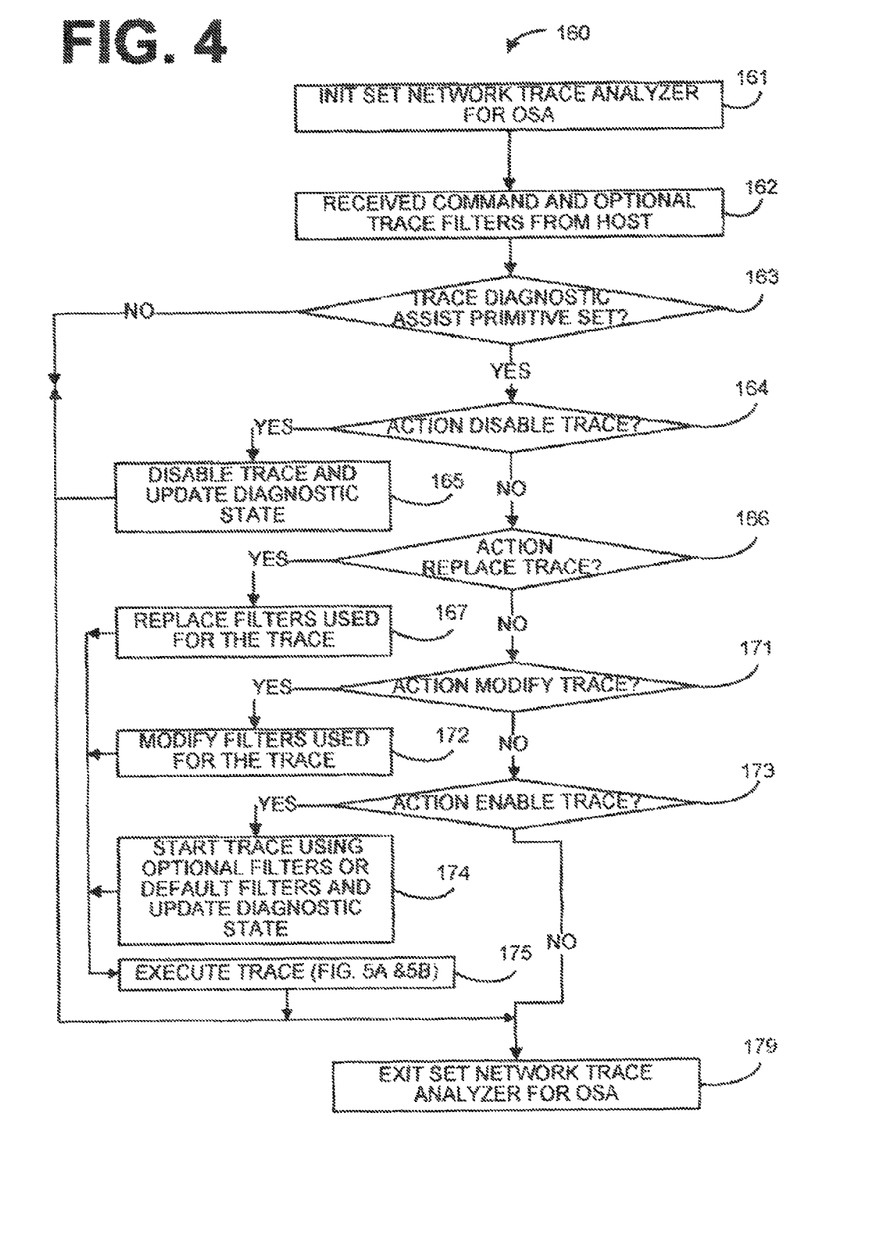
FIG. 4 is an example of a flow chart of the network trace analyzer process of the present invention.

FIG. 4 is an example of a flow chart of the set network trace analyzer of the present invention. The set network trace analyzer 160 for the OSA 104 is Initialized at step 161. The initialization includes the establishment of data values for particular data structures utilized in the set network trace analyzer 160 for OSA 104. At step 162, the OSA 104 receives a set diagnostic assist primitive from a host 110.

At step 163, the OSA 104 determines if the trace diagnostic assist primitive is set. If it is determined at step 163 the trace diagnostic assist primitive is set, then it is determined if the action to be taken it is a Disable Trace function at step 164. However, if it is determined at step 163 that the trace diagnostic assist primitive is not set, then the set network trace analyzer 160 exits at step 159.

At step 164, it is determined if the action to be taken is a Disable Trace, then the OSA 104 disables the capture of traces at step 165. The host 110 will disarm the trace when either: the trace has been disabled or the host 110 was stopped or shutdown. For example, when a trace is active (i.e. an enable trace request previously sent), and the operator "disables" the software trace, the host 110 will send a Disable Trace request to OSA 104. A disabled trace request will cause be OSA 104 two delete all active filters. When OSA 104 receives a SetDiagAsst with Action=Disable Trace, it will update the Diagnostic Assist State.

However, if it is determined at step 164 that the action to be taken is not a Disable Trace function, then it is determined at step 166 if the action to be taken is a Replace Trace function. If it is determined at step 166 that the action is a Replace Trace function, then the OSA 104 replaces the filters used in the trace function (FIGS. 5A & 5B) at step 167. In the exemplary embodiment, all the filters in the trace function are replaced as a set as received in the command at step 162. If the command does not include any filters, then all the filters are deleted. In the exemplary embodiment, the current trace data should not be lost or interrupted. Once the new filters become active, the new trace records should be delivered to the host 110 (i.e. no interruption in trace collection for old filters). The trace function and filters for the trace function are herein defined further detail with regard to FIGS. 5A & 5B.

However, if it is determined at step 166 that the action to be taken is not a Replace Trace function, then it is determined at step 171 if the action to be taken is a Modified Trace function. If it is determined at step 171 that the action is a Modified Trace function, then the OSA 104 will modify the filters used, at step 172, in the trace function (FIGS. 5A and 5B) with the ones received in the command at step 162. In the exemplary embodiment, the current trace data should not be lost or interrupted. Once the modified filters become active, the new trace records should be delivered to the host 110 (i.e. no interruption in trace collection for old filters).

However, if it is determined at step 171 that the action to be taken, is not a Modified Trace, then it is determined at step 173 if the action to be taken is an Enable Trace function. If it is determined at step 173 that the action to be taken is an Enable Trace function, then the OSA 104 to starts capture of traces at step 174. The trace function and filters are herein defined in further detail with regard FIGS. 5A and 5B. In the exemplary embodiment, the trace function utilizes the filters in the command received at step 162. In an alternative embodiment, the trace function (FIGS. 5A and 5B) utilizes default filters that are predefined by the operator of host 110.

When OSA 104 receives a SetDiagAsst with Action=Enable Trace, it will update the Diagnostic Assist State.

The OSA 104 then exits the set network trace analyzer 160 at step 179.

Figure 5A:
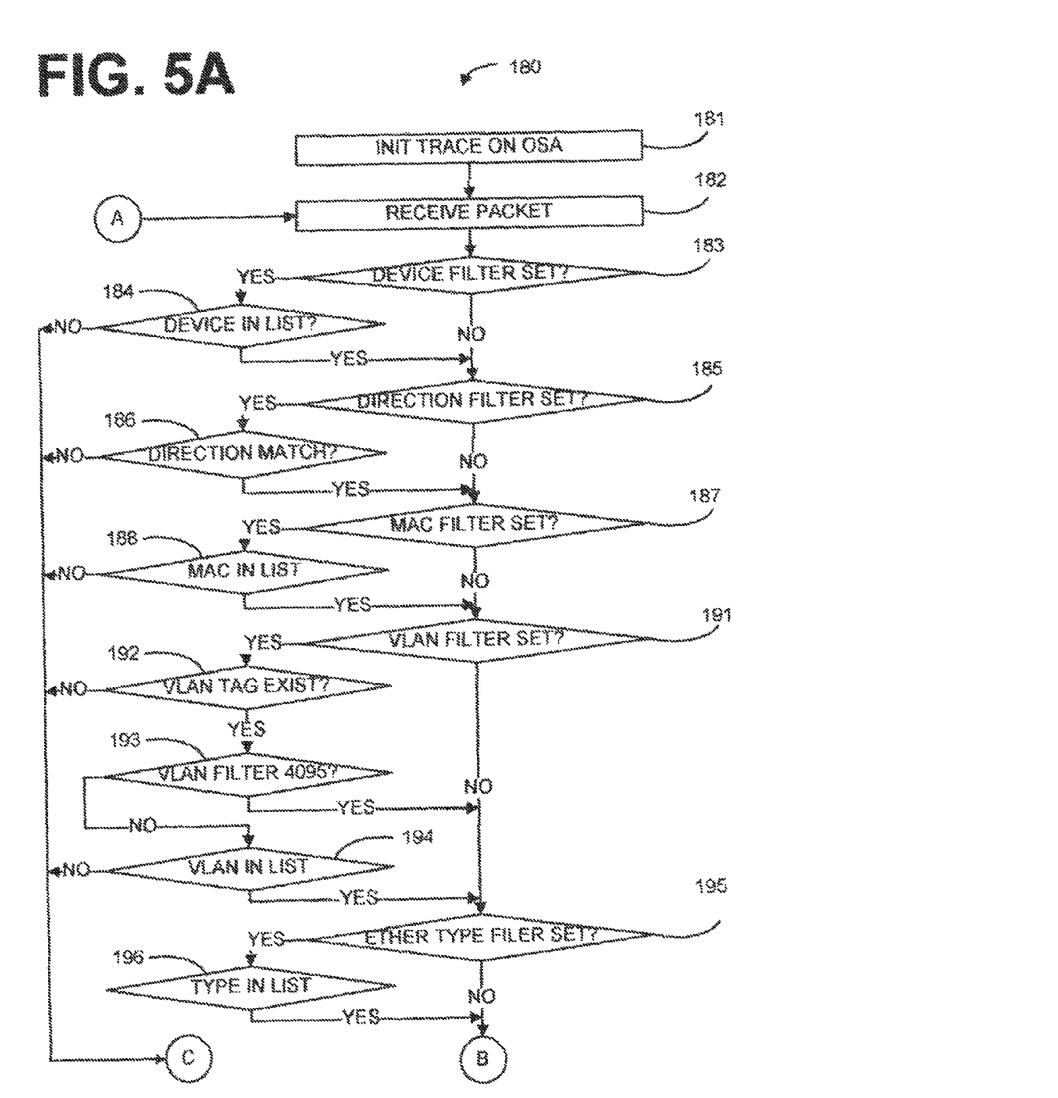
FIGS. 5A and 5B are examples of flow charts that trace processes of the present invention.
Figure 5B:
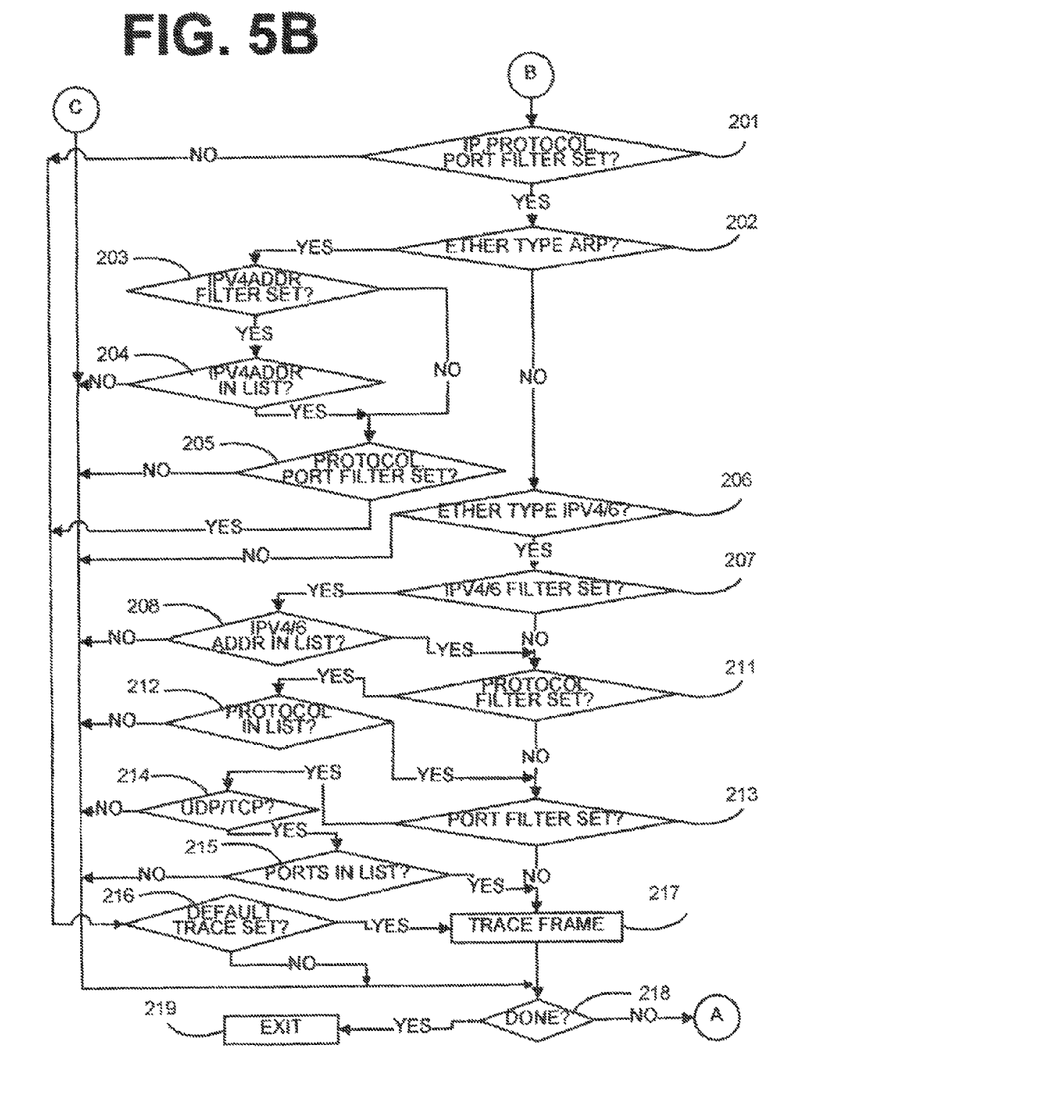

FIGS. 5A and 5B are examples of flow charts that trace analyzer 180 of the present invention. The trace analyzer 180 of the present invention describes the filter logic that OSA 104 will apply to each frame (packet) to determine if the frame should be traced (i.e. documented). In this example, the filters are shown in a hierarchical order, in an alternative embodiment, these filters could be applied as standalone filters.

The trace analyzer ISO for the OSA 104 initializes at step 181. The initialization includes the establishment of data values for particular data structures utilized in the trace analyzer 180 for OSA 104. In one embodiment, a default set of filters applied in a trace operation are loaded at step 181. At step 182, the OSA 104 receives a communication packet from either network 106 or host 110.

At step 183, the trace analyzer 180 determines if the device filter is set. If it is determined at step 183 that the device filter is not set, then the trace analyzer 180 proceeds to step 185. However, if it is determined at step 183 that the device filter is set, then the trace analyzer 180 determines if the frame received is associated with a device that in the filter list, at step 184. If the frame is not associated with a device and a device filter is set, then this is considered a filter mismatch. Some frames will not be associated with a device. If it is determined at step 184 that the frame is associated with a device, then the trace analyzer 180 proceeds to step 185. However, if it is determined at step 184 that the frame is not associated with a device, then the trace analyzer 180 proceeds to step 216.

At step 185, it determines if the direction filter is set. If it determines that the direction filter is not set, then the trace analyzer 180 proceeds to step 187. However, if it determines in step 185 mat the direction filter is set, then the trace analyzer then determines if the direction of the frame matches the filter at step 186. Directions include inbound, outbound, and inbound/outbound. If it determines at step 186 that the frame direction doesn't match the direction filter, then the trace analyzer 180 proceeds to step 187. However, if it determines at step 186 that the direction of the frame does not meet the direction filter, then the trace analyzer 180 proceeds to step 216.

At step 187, it is determined if the MAC filter is set. If it determines in step 187 that the MAC is not set, then the trace analyzer 180 proceeds to step 191. However, if it determines at step 187 that the MAC filter is set, then the trace analyzer 180 determines if the MAC address is in the filter list at step 188. If it determines at step 188 that the MAC address is in the filter list, then the trace analyzer 180 proceeds to step 191. Note that both virtual and real MAC addresses are supported as a valid filter. Also verify source and/or destination MAC address match (as specified in filter). However, if it determines that the Mac address for the frame received is not in the filter list, then the trace analyzer 180 proceeds to step 216.

At step 191, it determines if the virtual LAN address (VLAN) filter is set. If it is determined at step 191 that the VLAN filter is not set, then the trace analyzer 180 proceeds to step 195. However, if it determines at step 191 that the VLAN filter is set, then the trace analyzer 180 determines if the virtual LAN address identification (VLAN ID) tag exists at step 192. If it is determined to step 192 that the VLAN ID tag does not exist, then the trace analyzer 180 proceeds to step 194. However, if it is determined at step 192 that the VLAN ID tag does exist, then the trace analyzer 180 then proceeds to step 195.

At step 194, the trace analyzer 180 determines if the VLAN ID is in the filter list. If it determines at step 194 that the VLAN ID is in the filter list than the trace analyzer 180 proceeds to step 195. However, it is determined that the VLAN ID for the frame received is not in the filter list, then the trace analyzer 180 proceeds to step 216.

At step 195, the trace analyzer 180 determines if the ethernet type filter is set. If it determines at step 195 that the ethernet type filter is not set, then the trace analyzer 180 proceeds to step 197. However, if it is determined at step 195 that the ethernet type filter is set, then the trace analyzer 180 then determines if the type of frame received is using an ethernet type in the list at step 196. If it determines at step 196 that the frame received is using a ethernet type in the list than the trace analyzer 180 proceeds to step 197. However it is determined that there are a received is not using any ethernet type it in the list than the trace analyzer 180 proceeds to step 216.

At step 197, the trace analyzer 180 then determines if the IP, protocol and port filters are set. If it determines at step 197 that the IP, protocol and port filter are not set, then the trace analyzer 180 proceeds to step 214 to trace the frame received. However, if it determines at step 197 that the IP, protocol and port filter are set, then the trace analyzer 180 determines if the frame received is an ethernet type ARP at step 198. If it determines that the frame received is of ethernet type ARP, then the trace analyzer 180 proceeds to step 201. However, if it determines at step 198 that the frame received is not of an ethernet type ARP, then the trace analyzer 180 proceeds to step 204, At step 201, trace analyzer 180 determines if the IPV4 address filter is set. If it determines at step 201 that the IPV4 address filter is not set, then the trace analyzer 180 proceeds to step 203. However, if it determines at step 201 that the IPV4 address filter is set, then the trace analyzer 180 determines if the frame received has an IPV4 address that is in the filter list at step 202. If it determines at step 202 that the frame received has an IPv4 address that is in the filter list, then it proceeds to step 203. However, if it is determined at step 202 that the frame received has an IPv4 address that is not in the filter list, then the trace analyzer 180 proceeds to step 216 and exits the trace analyzer 180.

At step 203, the trace analyzer 180 determines if the combined protocol and port filter is set. If it determines at step 203 the combined protocol and port filter is set, then the trace analyzer 180 proceeds to step 215. However, if it determines at step 203 the protocol and port filter is not set, then the trace analyzer proceeds to step 216.

At step 204, the trace analyzer 180 determines if the frame received is of ethernet type IPv4 or IPv6. If it determines at step 204 the frame received was a ethernet type IPv4 or IPv6, then the trace analyzer 180 determines if the IPv4 or IPv6 filter is set at step 205. If it determines at step 205 that the IPv4 or IPv6 filter is not set, then the trace analyzer 180 proceeds to step 207. However, if it determines at step 205 that the IPv4 or IPv6 filter is set, then the trace analyzer 180 determines if the address in the frame received is in the IPv4 or IPv6 filter list at step 206. If it determines at step 206 that the frame received IPv4 or IPv6 address is in the trace list, then the trace analyzer 180 proceeds to step 207. This can be for either the host or client IP address match (as specified in filter). Filtering on Cast type (Unicast, Broadcast, and Multicast) is achieved with an IP address mask. However, if it determines at step 206 that the frame received IPv4 or IPv6 address is not in the trace list, then the trace analyzer 180 proceeds to step 216.

At step 207, the trace analyzer 180 determines if the protocol filter is set. If it is determined at step 207 that the protocol filter was not set, then the trace analyzer 180 proceeds to step 211. However, if it determines at step 207 that the protocol filter is set, then the trace analyzer determines if the protocol of the frame received is in the protocol trace list at step 208. If it is determined at step 208 that the protocol of the frame received is in the protocol trace list, then the trace analyzer proceeds to step 211. However, if it determines at step 208 that the protocol of the frame received is not in the protocol trace list, then the trace analyzer proceeds to step 216.

At step 211 the trace analyzer 180 determines at the port filter is set. If it is determined in step 211 at the port filter is not set, then the trace analyzer proceeds to step 214. However, if it determines at step 211 at the port filter is set, then the trace analyzer 180 determines if the frame received is either a TCP or UDP type. If it is determined at step 212 that the frame received is not either a TCP or UDP type, then the trace analyzer proceeds to step 216. However, if it is determined at step 212 that the frame received is a TCP or UDP type, then the trace analyzer determines if the port numbers of the frame received are in the trace list at step 213. If it determines at step 213 that the port numbers of the frame received are in the trace list, then the trace analyzer proceeds to step 214 and traces the frame received. However, if it determines at step 213 that the port numbers of the frame received are not in the trace list, then the trace analyzer proceeds to step 216.

At the step 214, the trace analyzer 180 determines if the default trace or control filter is set. If there has been no match to any filters, then the trace analyzer 180 will determine the default behavior. In the exemplary embodiment, if there are no filter matches then the frame will not be traced. However, the default may include tracing of particular areas or the whole frame as defined by the default trace or control filter. The default tracer or control filter is loaded at initialization.

At step 215, the trace analyzer 180 traces all information of the frame received at step 182. The trace analyzer 180 then stores ail frame data in a memory device on the OSA. Also included is time of day (TOD) information that can be being utilized to correlate data received with data transmitted to/from the host.

At step 216, the trace analyzer 180 determines if more tracing is to be done. If it determines at step 216 that more tracing of packets/frames are to be done, then the trace analyzer 180 returns to repeat steps 182 through 216. However, if it determines at step 216 that there is no more tracing to be done, then the trace analyzer 180 exits at step 219.

The present invention can take the form of an entirely hardware embodiment, an entirely software embodiment or an embodiment containing both hardware and software elements. In the exemplary embodiment, the invention, is implemented in software (i.e. computer program product), which includes but is not limited to firmware, resident software, microcode, etc.

Furthermore, the invention can take the form of a computer program product accessible from a computer-usable or computer-readable medium providing program code for use by or in connection with a computer or any instruction execution (i.e. processing circuit) system. For the purposes of this description, a computer-usable or computer readable medium can be any apparatus that can contain, store, communicate, propagate, or transport the program for use by or in connection with the instruction execution system, apparatus, or device.

The storage medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It should be emphasized that the above-described embodiments of the present invention, particularly, any "exemplary" embodiments, are merely possible examples of implementations, merely set forth for a clear understanding of the principles of the invention. Many variations and modifications may be made to the above-described embodiments) of the invention without departing substantially from the spirit and principles of the invention. All such modifications and variations are intended to be included herein within the scope of this disclosure and the present, invention and protected by the following claims.

What is claimed is:

1. A method for implementing integrated software and hardware trace collection processes on a virtual network configuration, the method comprising:

receiving, at a remote network adapter, a diagnostic signal data packet from a host operating system of a computing device included in the virtual network configuration, the diagnostic signal data packet being triggered by a software trap event occurring within the host operating system, wherein the software trap event comprises a software error condition detected by the host operating system;

associating the diagnostic signal data packet with a tracing state of the remote network adapter; and performing, by the remote network adapter, a hardware tracing function indicated by the diagnostic signal data packet, the hardware tracing function comprising one or more of an enable trace function, a modify trace filter function, a replace trace filter function, and a disable trace filter function, thereby facilitating the coordination of hardware and software trace collection at the same time.

2. The method of claim 1, wherein the remote network adapter utilizes filter information that limits what type of data the remote network adapter traces.

3. The method of claim 2, wherein the filter information comprises predefined default filters.

4. The method of claim 2, wherein the filter information is included in the diagnostic signal data packet from the host operating system.

5. The method of claim 4, wherein the modify trace filter function causes the remote network adapter to modify currently used filter information in tracing data.

6. The method of claim 4, wherein the replace trace filter function causes the remote network adapter to replace all of currently used filter information in tracing data.

7. A computer readable storage medium having computer readable instructions stored thereon that, when executed by a computer, implement a method of integrating software and hardware trace collection processes on a virtual network configuration, wherein the method comprises:

receiving, at a remote network adapter, a diagnostic signal data packet from a host operating system of a computing device included in the virtual network configuration, the diagnostic signal data packet being triggered by a software trap event occurring within the host operating system, wherein the software trap event comprises a software error condition detected by the host operating system;

associating the diagnostic signal data packet with a tracing state of the remote network adapter; and performing, by the remote network adapter, a hardware tracing function indicated by the diagnostic signal data packet, the hardware tracing function comprising one or more of an enable trace function, a modify trace filter function, a replace trace filter function, and a disable trace filter function, thereby facilitating the coordination of hardware and software trace collection at the same time.

8. The computer readable storage medium of claim 7, wherein the method further comprises the remote network adapter utilizing filter information that limits what type of data the remote network adapter traces.

9. The computer readable storage medium of claim 8, wherein the filter information comprises predefined default filters.

10. The computer readable storage medium of claim 8, wherein the filter information is included in the diagnostic signal data packet from the host operating system.

11. The computer readable storage medium of claim 10, wherein the modify trace filter function causes the remote network adapter to modify currently used filter information in tracing data.

12. The computer readable storage medium of claim 10, wherein the replace trace filter function causes the remote network adapter to replace all of currently used filter information in tracing data.

13. A virtual network system with integrated software and hardware trace collection process capability, the system comprising:

a host operating system associated with a computing device; and a remote network adapter in communication with the host operating system, wherein the remote network adapter is configured to:

receive a diagnostic signal data packet from the host operating system, the diagnostic signal data packet being triggered by a software trap event occurring within the host operating system, wherein the software trap event comprises a software error condition detected by the host operating system;

associate the diagnostic signal data packet with a tracing state of the remote network adapter; and perform, by the remote network adapter, a hardware tracing function indicated by the diagnostic signal data packet, the hardware diagnostic function comprising one or more of an enable trace function, a modify trace filter function, a replace trace filter function, and a disable trace filter function, thereby facilitating the coordination of hardware and software trace collection at the same time.

14. The system of claim 13, wherein the remote network adapter utilizes filter information that limits what type of data the remote network adapter traces.

15. The system of claim 14, wherein the filter information comprises predefined default filters.

16. The system of claim 14, wherein the filter information is included in the diagnostic signal data packet from the host operating system.

17. The system of claim 16, wherein the modify trace filter function causes the remote network adapter to modify currently used filter information in tracing data.

18. The system of claim 16, wherein the replace trace filter function causes the remote network adapter to replace all of currently used filter information in tracing data.

* * * * *